US012771495B2

(12) United States Patent
Qiao

(10) Patent No.: US 12,771,495 B2
(45) Date of Patent: Oct. 20, 2026

(54) FREQUENCY HOPPING METHOD AND APPARATUS

(71) Applicant: Beijing Xiaomi Mobile Software Co., Ltd., Beijing (CN)

(72) Inventor: Xuemei Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 305 days.

(21) Appl. No.: 18/554,314

(22) PCT Filed: Apr. 7, 2021

(86) PCT No.: PCT/CN2021/085766
§ 371 (c)(1),
(2) Date: Oct. 6, 2023

(87) PCT Pub. No.: WO2022/213295
PCT Pub. Date: Oct. 13, 2022

(65) Prior Publication Data
US 2024/0380531 A1 Nov. 14, 2024

(51) Int. Cl.
*H04L 5/00* (2006.01)
*H04W 72/044* (2023.01)

(52) U.S. Cl.
CPC ......... *H04L 5/0012* (2013.01); *H04W 72/044* (2013.01)

(58) Field of Classification Search
None
See application file for complete search history.

(56) References Cited

U.S. PATENT DOCUMENTS

| | | | | |
|---|---|---|---|---|
| 12,010,705 B2 * | 6/2024 | Sengupta | .................. | H04L 1/04 |
| 2019/0075581 A1 * | 3/2019 | Salem | ............... | H04W 72/1268 |
| 2023/0291515 A1 * | 9/2023 | Dai | ....................... | H04L 1/1819 |
| 2024/0114490 A1 * | 4/2024 | Bhamri | ................. | H04L 5/0012 |
| 2024/0179688 A1 * | 5/2024 | Echigo | ............. | H04W 72/0446 |

FOREIGN PATENT DOCUMENTS

| | | |
|---|---|---|
| CN | 112449419 A | 3/2021 |
| WO | 2020166696 A1 | 8/2020 |

OTHER PUBLICATIONS

Office Action issued by the Russian Federation Federal Institute of Industrial Property on Apr. 23, 2024, in corresponding Application No. RU 2023127413/07, 10 pages.

(Continued)

*Primary Examiner* — Saumit Shah
(74) *Attorney, Agent, or Firm* — Finnegan, Henderson, Farabow, Garrett & Dunner, L.L.P.

(57) ABSTRACT

A frequency hopping method is performed by a terminal device, and includes: determining a frequency hopping pattern of a physical uplink shared channel (PUSCH); determining at least one of a number of hops or a time-domain length of a hop, wherein a transmission pattern of the PUSCH is transport block processing over multi-slots (TBoMS); and performing frequency hopping according to the frequency hopping pattern of the PUSCH, and the at least one of the number of hops or the time-domain length of the hop.

16 Claims, 4 Drawing Sheets

(56) References Cited

OTHER PUBLICATIONS

Request for the Submission of an Opinion issued by the Korean Patent Office on Mar. 2, 2025, in corresponding Application No. KR 10-2023-7037839, 11 pages.
International Search Report and Written Opinion of International Application No. PCT/CN2021/085766, dated Jan. 6, 2022, 13 pages.
LG Electronics, "Remaining aspects of long PUCCH for UCI of more than 2 bits", 3GPP TSG RAN WG1 Meeting 91, R1-1719925, Reno, USA, Nov. 27-Dec. 1, 2017, 11 pages.
Lenovo, Motorola Mobility, "Enhancements for TB processing over multi-slot PUSCH", 3GPP TSG RAN WG1 #104-e, R1-2101002, e-meeting, Jan. 25-Feb. 5, 2021, 3 pages.

* cited by examiner

FREQUENCY HOPPING METHOD AND APPARATUS

CROSS-REFERENCE TO RELATED APPLICATION

This application is a national phase of International Application No. PCT/CN2021/085766, filed on Apr. 7, 2021, the entire content of which is incorporated herein by reference.

TECHNICAL FIELD

The disclosure relates to the field of communication technologies, and more particularly, to a frequency hopping method and a frequency hopping apparatus.

BACKGROUND

Currently, a time-domain resource allocation (TDRA) on a physical uplink shared channel (PUSCH) may use a PUSCH repetition type B like TDRA table. Type B PUSCH repetition supports two frequency hopping patterns: inter-nominal-PUSCH-repetition frequency hopping and inter-slot frequency hopping. The frequency hopping pattern is configured by a radio resource control (RRC) high-layer signaling.

SUMMARY

In a first aspect, the disclosure provides a frequency hopping method. The method is performed by a terminal device. The method includes: determining a frequency hopping pattern of a physical uplink shared channel (PUSCH); determining at least one of a number of hops or a time-domain length of a hop; in which a transmission pattern of the PUSCH is transport block processing over multi-slots (TBoMS); and performing frequency hopping according to the frequency hopping pattern of the PUSCH, and the at least one of the number of hops or the time-domain length of the hop.

In a second aspect, the disclosure provides a frequency hopping method. The method is performed by a base station. The method includes: determining a frequency hopping pattern of a PUSCH; determining at least one of a number of hops or a time-domain length of a hop of a user equipment (UE); in which a transmission pattern of the PUSCH is TBoMS; and performing frequency hopping for the UE according to the frequency hopping pattern of the PUSCH, and the at least one of the number of hops or the time-domain length of the hop.

In a third aspect, the disclosure provides a communication device. The device includes a processor and a memory. The memory stores a computer program and the processor executes the computer program stored in the memory, so that the device performs the method as described in the first aspect above.

BRIEF DESCRIPTION OF THE DRAWINGS

The accompanying drawings will be briefly described below.

DETAILED DESCRIPTION

For ease of understanding, terminologies involved in the disclosure is first introduced.

1, Downlink Control Information (DCI)

The DCI is carried by a physical downlink control channel (PDCCH). The DCI may include an uplink and downlink resource allocation, hybrid automatic repeat request (HARQ) information, power control, and the like.

2, Physical Uplink Shared Channel (PUSCH)

The PUSCH is used to carry user-related long-term evolution (LTE) uplink services and high-layer signaling data. As the main uplink data carrying channel of the physical layer, it may schedule and transmit uplink data and also carry control information.

3, Demodulation Reference Signal (DMRS)

It may be used in communication technologies for correlated demodulation of a PUSCH and a PUCCH.

4, Frequency Hopping (FH)

The frequency hopping refers to a communication pattern in which both a reception terminal and a transmission terminal transform frequency-domain resources used in the information transmission or reception process according to predetermined rules, so as to obtain a frequency diversity gain.

In order to better understand a frequency hopping method proposed in embodiments of the disclosure, the following first describes a communication system used in the embodiments of the disclosure.

Figure 1:
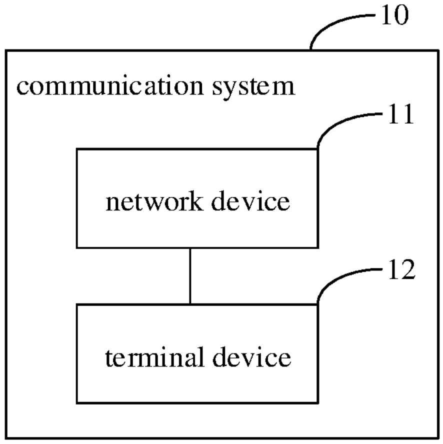
FIG. 1 is a schematic diagram of a communication system according to some embodiments of the disclosure.

As illustrated in FIG. 1, FIG. 1 is a schematic diagram of a communication system 10 according to some embodiments of the disclosure. The communication system 10 includes, but is not limited to, a network device 11 and a terminal device 12. The number and shapes of devices in FIG. 1 are for examples and do not constitute limitations to the embodiments of the disclosure. In practical applications, two or more network devices 11 may be included and two or more terminal devices 12 may be included. The communication system in FIG. 1 includes one network device 11 and one terminal device 12 as an example.

It should be noted that the technical solutions of the embodiments of the disclosure may be applied to various communication systems. For example: a long term evolution (LTE) system, a fifth generation (5G) mobile communication system, a 5G new radio (NR) system, or other future new mobile communication systems.

The network device 11 in some embodiments of the disclosure is an entity on the network side for transmitting or receiving signals. For example, the network device 11 may be an evolved NodeB (eNB), a transmission reception point (TRP), a next generation NodeB (gNB) in an NR system, a base station in other future mobile communication systems, an access node in a wireless fidelity (Wi-Fi) system, or the like. The embodiments of the disclosure do not limit the specific technology and specific device form adopted by the network device. The network device in the embodiments of the disclosure may include a central unit (CU) and a distributed unit (DU). The CU may also be called a control unit. By adopting a CU-DU structure, protocol layers of the network device such as the base station may be splitted, functions of some protocol layers are centrally controlled by the CU, functions of the remaining part or all the protocol layers are distributed in the DU, and the CU centrally controls the DU.

The terminal device 12 in some embodiments of the disclosure is an entity on the user side for transmitting or receiving signals, such as a mobile phone. The terminal device may also be referred to as a terminal, a user equipment (UE), a mobile station (MS), a mobile terminal (MT), or the like. The terminal device may be a car with a communication function, a smart car, a mobile phone, a wearable device, a tablet computer, a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, or the like. The embodiments of the disclosure do not limit the specific technology and specific device form adopted by the terminal device.

A TDRA on a PUSCH may use a PUSCH repetition type B like TDRA table. Type B PUSCH repetition, that is, PUSCH repetition based on sub-slot aggregation, which may further reduce the transmission delay while enhancing the PUSCH transmission reliability. For Type B PUSCH repetition, an uplink authorization signaling or first type of authorization-free configuration information indicates a resource of a first nominal PUSCH and time-domain resources for the remaining PUSCH repetition depend on the first PUSCH repetition and an available symbol. The number of repetitions indicated by the base station represents the number of nominal repetitions and the number of actual repetitions may be greater than the number of nominal repetitions. When the time domain resource of the nominal PUSCH crosses the slot boundary, it may be divided into two actual PUSCH repetitions. Type B PUSCH repetition supports two frequency hopping patterns: inter-nominal-PUSCH-repetition frequency hopping and inter-slot frequency hopping. The frequency hopping pattern is configured by a radio resource control (RRC) high-layer signaling.

However, these two existing frequency hopping patterns are no longer applicable to a case when the time-domain resource allocation of the PUSCH is a transport block processing over multi-slots (TBoMS) pattern. The disclosure proposes a frequency hopping method for the TBoMS pattern to satisfy the TBoMS pattern.

It should be understood that the communication system described in the embodiments of the disclosure is for the purpose of illustrating the technical solutions of the embodiments of the disclosure more clearly and does not constitute a limitation on the technical solutions of the embodiments of the disclosure. For those skilled in the art, with the evolution of the system architecture and the emergence of the new service scenario, the technical solutions of the embodiments of the disclosure are also applicable to similar technical problems.

A frequency hopping method and a frequency hopping apparatus provided in the disclosure will be introduced in detail below with reference to the accompanying drawings.

Figure 2:
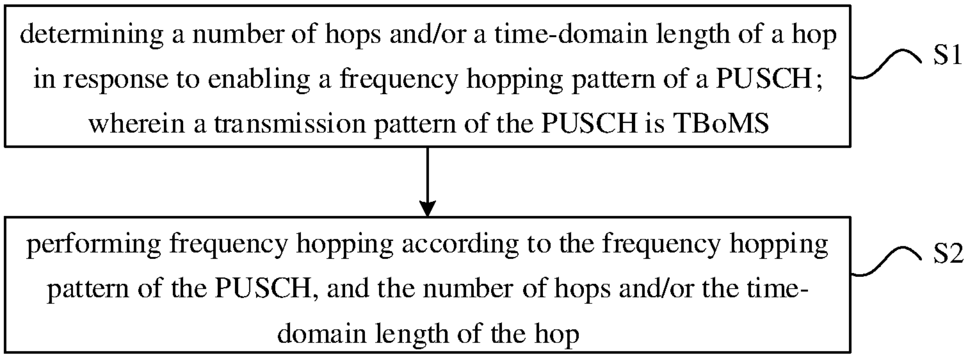
FIG. 2 is a schematic flowchart of a frequency hopping method according to some embodiments of the disclosure.

With reference to FIG. 2, FIG. 2 is a schematic flowchart of a frequency hopping method according to some embodiments of the disclosure. The method is performed by a terminal device. As illustrated in FIG. 2, the method may include but not limited to the following steps.

S1, a number of hops and/or a time-domain length of a hop is determined in response to enabling a frequency hopping pattern of a PUSCH; in which a transmission pattern of the PUSCH is TBoMS.

In embodiments of the disclosure, a time-domain resource allocation pattern of the PUSCH is TBoMS. In the fifth-generation mobile communication (5G) new radio (NR) system being studied by the 3rd generation partnership project (3GPP), a time-domain length of one radio frame is 10 milliseconds (ms). One radio frame is equal to 10 subframes. One subframe may include multiple slots. Each slot includes a certain number of time-domain symbols.

Figure 3:
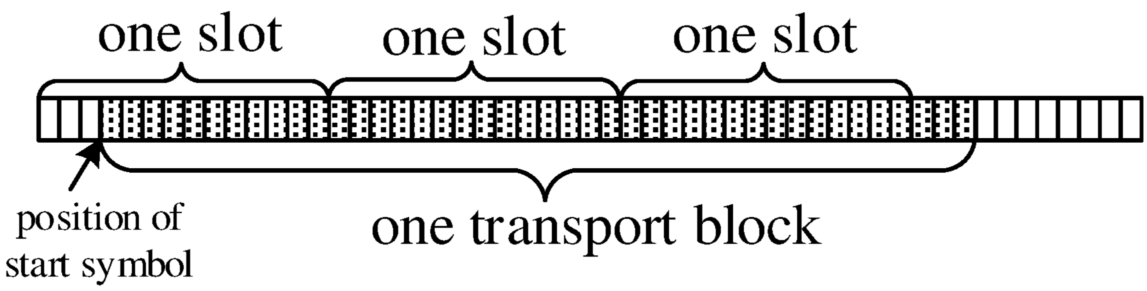
FIG. 3 is a schematic diagram of time-domain resources of a TBoMS pattern according to some embodiments of the disclosure.

The embodiments of the disclosure are described by taking each slot including 14 time-domain symbols as an example. In detail, as illustrated in FIG. 3, each transport block occupies 42 time-domain symbols. The position of the start symbol is 3. At this time, one transport block needs to be transmitted in 4 slots, that is, the time-domain resource allocation of the PUSCH is that one transport block requires 4 slots for transmission.

The position of the start symbol of the transport block may be any one of 0 to 13, which may be set as required.

It should be understood that one transport block requires multiple slots for transmission, which may be two or more slots. FIG. 3 is only used as an example for illustration. It may be determined based on the number of time-domain symbols occupied by each transport block, the starting position of the transport block and the number of time-domain symbols included in the slot.

The frequency hopping method of the embodiments of the disclosure is a frequency hopping method when the time domain resource allocation pattern of the PUSCH is that the number of time-domain symbols occupied by each transport block is greater than the number of time-domain symbols included in one slot.

S2, frequency hopping is performed according to the frequency hopping pattern of the PUSCH, and the number of hops and/or the time-domain length of the hop.

In detail, the frequency hopping is performed according to the frequency hopping pattern and the number of hops, or the frequency hopping is performed according to the frequency hopping pattern and the time-domain length of the hop, or the frequency hopping is performed according to the frequency hopping pattern, the number of hops and the time-domain length of the hop.

In the frequency hopping method provided in the embodiments of the disclosure, when the frequency hopping pattern of the PUSCH is enabled, the terminal device determines the number of hops and/or the time-domain length of the hop, in which the time-domain resource allocation pattern of the PUSCH is the TBoMS, and then the terminal device performs the frequency hopping according to the frequency hopping pattern, the number of hops and/or the time-domain length of the hop, and may perform the frequency hopping when the time-domain resource allocation pattern of the PUSCH is the TBoMS pattern, thereby obtaining the frequency diversity gain and improving the coverage capability.

In some embodiments, determining the number of hops includes: determining the number of hops according to a protocol agreement.

In some embodiments of the disclosure, the number of hops may be agreed by the protocol.

In some embodiments, determining the number of hops according to the protocol agreement includes: obtaining a first preset value agreed by the protocol; in which the first preset value is greater than or equal to 2; and determining the first preset value as the number of hops.

For example, when the protocol agrees that the first preset value is 2, the number of hops is 2. Of course, the protocol may also agree that the first preset value is another integer greater than 2, which is not limited in the disclosure.

In some embodiments, determining the number of hops according to the protocol agreement includes: obtaining a time-domain length occupied by the transport block; and determining the number of hops according to a correspondence relationship agreed by the protocol between the time-domain length occupied by the transport block and the number of hops, and the obtained time-domain length occupied by the transport block.

It should be understood that the correspondence relationship agreed by the protocol between the time-domain length occupied by the transport block and the number of hops may be the one-to-one correspondence relationship, that is, the number of hops corresponds to different values according different time-domain lengths occupied by transport blocks. Alternatively, the correspondence relationship between the time-domain length occupied by the transport block and the number of hops may be the proportional relationship. Alternatively, the correspondence relationship may be the other relationship in which the value of one side may be obtained according to the value of the other side, that is, the number of hops may be directly determined according to the time-domain length occupied by the transport block.

For example, the protocol agrees that when the time-domain length occupied by the transport block is 16 symbols, the corresponding number of hops is 2. Then when the obtained time-domain length occupied by the transport block is 16 symbols, the number of hops is determined to be 2.

In some embodiments, determining the number of hops according to the protocol agreement includes: obtaining a number of demodulation reference signals (DMRSs) configured in the PUSCH; and determining the number of hops according to a correspondence relationship agreed by the protocol between the number of DMRSs configured and the number of hops, and the obtained number of DMRSs configured in the PUSCH.

It should be understood that the correspondence relationship agreed by the protocol between the number of DMRSs configured and the number of hops may be the one-to-one relationship, that is, the number of hops corresponds to different values according different numbers of DMRSs configured. Alternatively, the correspondence relationship between the number of DMRSs configured and the number of hops is the proportional relationship. Alternatively, the correspondence relationship may be the other relationship in which the value of one side may be obtained according to the value of the other side, that is, the number of hops may be directly determined according to the number of DMRSs.

For example, the correspondence relationship between the number of DMRSs configured and the number of bops is the proportional relationship, such as the number of DMRSs is k times the number of hops and k is greater than or equal to 1. When k is equal to 1 and the obtained number of DMRSs is 3, the number of hops is determined to be 3.

In some embodiments, determining the number of hops according to the protocol agreement includes: obtaining a time-domain length occupied by the transport block; and determining the number of hops according to a time-domain length of the hop agreed by the protocol, a correspondence relationship agreed by the protocol among the time-domain length of the hop, the time-domain length occupied by the transport block and the number of hops, and the obtained time-domain length occupied by the transport block.

In the embodiments of the disclosure, the time-domain length of the hop is agreed by the protocol, and the correspondence relationship among the time-domain length of the hop, the time-domain length occupied by the transport block and the number of hops is agreed by the protocol, and then the number of hops may be determined according to the obtained time-domain length occupied by the transport block.

In some embodiments, the correspondence relationship agreed by the protocol among the time-domain length of the hop, the time-domain length occupied by the transport block and the number of hops includes: the time-domain length occupied by the transport block being a product of the number of hops and the time-domain length of the hop.

For example, the protocol agrees that the time-domain length of the hop is 7 and the correspondence relationship is that the time-domain length occupied by the transport block being a product of the number of hops and the time-domain length of the hop. When the obtained time-domain length occupied by the transport block is 42, the number of hops may be determined to be 6.

In some embodiments, determining the number of hops according to the protocol agreement includes: obtaining a position of an unavailable symbol in the PUSCH, in which the unavailable symbol cannot be used to transmit data; and determining a frequency hopping start position and a frequency hopping end position according to a correspondence relationship agreed by the protocol among the position of the unavailable symbol, the frequency hopping start position and the frequency hopping end position, and the obtained position of the unavailable symbol in the PUSCH.

For example, the unavailable symbol in the PUSCH is: in the unpaired spectrum, the guard symbol used for the downlink-to-uplink handover, configured by the high-layer signaling, is the unavailable symbol; or a 1-bit symbol pattern indication information configured in the DCI provided by the base station is the unavailable symbol; or the like. It should be understood that the unavailable symbol in the PUSCH is not only the two types of the above examples, and the above two types of unavailable symbols are only for illustration.

In some embodiments, the correspondence relationship agreed by the protocol among the position of the unavailable symbol, the frequency hopping start position and the frequency hopping end position includes: a position of an adjacent symbol previous to the unavailable symbol is the frequency hopping end position; and a position of an adjacent symbol following the unavailable symbol is the frequency hopping start position.

In detail, in the embodiments of the disclosure, the position of the unavailable symbol in the PUSCH is obtained, and the frequency hopping start position and the frequency hopping end position are determined according to the position of the unavailable symbol.

Figure 4:
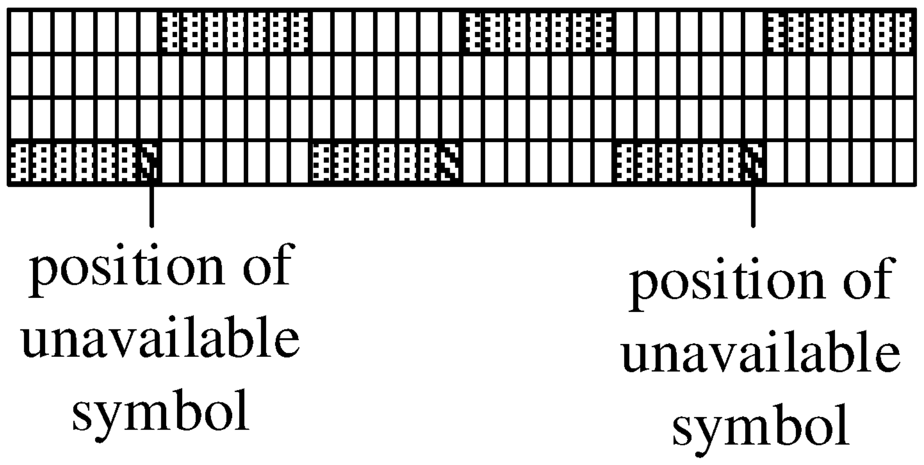
FIG. 4 is a schematic diagram of a frequency hopping according to some embodiments of the disclosure.

For example, as illustrated in FIG. 4, the position of the adjacent symbol previous to the position of the unavailable symbol is the frequency hopping end position; and the position of the adjacent symbol following the position of the unavailable symbol is the frequency hopping start position.

In some embodiments, determining the number of hops according to the protocol agreement includes: obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

It should be understood that one radio frame is equal to 10 subframes, one subframe may include multiple slots, each slot includes a certain number of time-domain symbols, and the slot boundary may be the boundary of the time-domain symbol included in the slot. Each slot includes two slot boundaries, and two adjacent slots have a common slot boundary.

In some embodiments, the correspondence relationship agreed by the protocol among the position of the slot boundary, the frequency hopping start position and the frequency hopping end position includes: a position of an adjacent symbol previous to the position of the slot boundary is the frequency hopping end position; and a position of an adjacent symbol following the position of the slot boundary is the frequency hopping start position.

Figure 5:
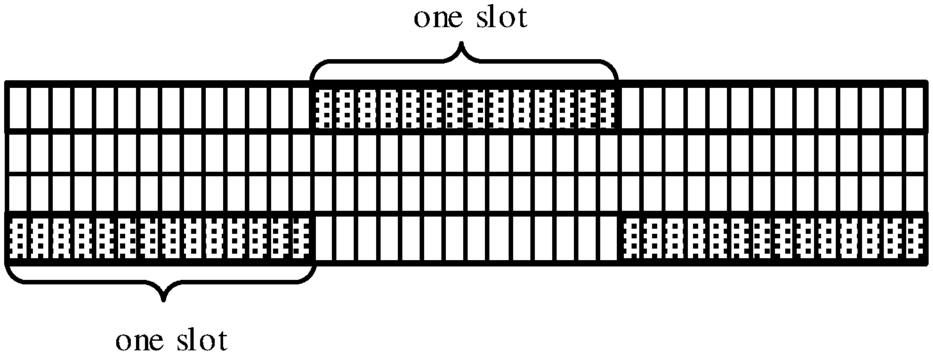
FIG. 5 is a schematic diagram of another frequency hopping according to some embodiments of the disclosure.

For example, as illustrated in FIG. 5, the position of the adjacent symbol previous to the position of the slot boundary is the frequency hopping end position; and the position of the adjacent symbol following the position of the slot boundary is the frequency hopping start position.

In some embodiments, determining the number of hops according to the protocol agreement includes: obtaining a position of a slot boundary in the PUSCH and a first preset number of symbols, and determining a frequency hopping start position and a frequency hopping end position according to a correspondence relationship agreed by the protocol among the position of the slot boundary, the first preset number of symbols, the frequency hopping start position and the frequency hopping end position, and the obtained position of the slot boundary in the PUSCH and the obtained first preset number of symbols.

In some embodiments of the disclosure, the first preset number of symbols may be any value greater than 0 and less than the number of time-domain symbols included in the slot, which is not specifically limited.

In some embodiments, the correspondence relationship agreed by the protocol among the position of the slot boundary, the first preset number of symbols, the frequency hopping start position and the frequency hopping end position includes: a position of an adjacent symbol previous to the position of the slot boundary is the frequency hopping end position, and a position of an adjacent symbol following the position of the slot boundary is the frequency hopping start position; and a position of a symbol previous to the position of the slot boundary and separated by the first preset number of symbols from the position of the slot boundary is the frequency hopping start position, and a position of a symbol following the position of the slot boundary and separated by the first preset number of symbols from the position of the slot boundary is the frequency hopping end position.

Figure 6:
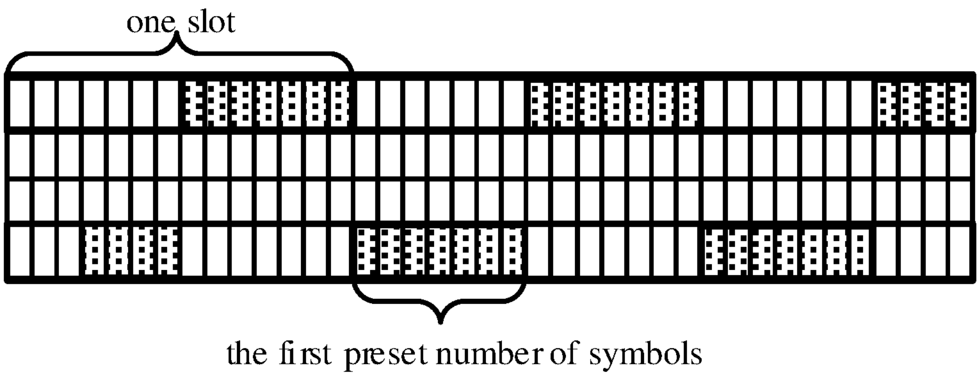
FIG. 6 is a schematic diagram of another frequency hopping according to some embodiments of the disclosure.

For example, as illustrated in FIG. 6, when the number of time-domain symbols included in the slot is 14 and the first preset number of symbols is 7, the position of the adjacent symbol previous to the position of the slot boundary is the frequency hopping end position, and the position of the adjacent symbol following the position of the slot boundary is the frequency hopping start position; and the position of the symbol previous to the position of the slot boundary and separated by the first preset number of symbols from the position of the slot boundary is the frequency hopping start position, and the position of the symbol following the position of the slot boundary and separated by the first preset number of symbols from the position of the slot boundary is the frequency hopping end position.

In some embodiments, determining the number of hops includes: determining the number of hops according to a configuration of a base station.

In embodiments of the disclosure, the number of hops may be determined through the configuration of the base station.

In some embodiments, determining the number of hops according to the configuration of the base station includes: receiving a third preset value sent by the base station; in which the third preset value is greater than or equal to 2; and determining the third preset value as the number of hops.

For example, when the protocol agrees that the third preset value is 2, the number of hops is 2. Of course, the protocol may also agree that the third preset value is another integer greater than 2, which is not limited in the disclosure.

In some embodiments, receiving the third preset value configured by the base station includes: receiving the third preset value sent by the base station through an RMSI signaling, or an RRC signaling, or a DCI signaling, or an MAC CE signaling.

In the embodiments of the disclosure, the third preset value sent by the base station through the RMSI signaling, or the RRC signaling, or the DCI signaling, or the MAC CE signaling is first received.

In some embodiments, receiving the third preset value sent by the base station through the DCI signaling includes: receiving the third preset value sent by the base station through the DCI signaling by multiplexing part or all of bits in a MCS field or in a TPC field in the DCI signaling or by adding a new field in the DCI signaling.

In some embodiments, determining the number of hops according to the configuration of the base station includes: receiving one first parameter value in a first parameter set, indicated by the base station, and determining the first parameter value as the number of hops.

In some embodiments, receiving the one first parameter value in the first parameter set, indicated by the base station includes: receiving the first parameter set configured by the base station through an RMSI signaling or an RRC signaling; and receiving the one first parameter value in the first parameter set, sent by the base station through a DCI signaling or an MAC CE signaling.

In some embodiments, receiving the one first parameter value in the first parameter set, indicated by the base station includes: receiving the first parameter set carried on a field added by the base station in an MCS table or in a TDRA table; and receiving the one first parameter value in the first parameter set, sent by the base station through a DCI signaling by multiplexing an MCS field in the DCI signaling.

In some embodiments, determining the number of hops according to the configuration of the base station includes: obtaining a time-domain length occupied by the transport block; and determining the number of hops according to a time-domain length of the hop configured by the base station, a specific calculation rule configured by the base station among the time-domain length of the hop, the time-domain length occupied by the transport block and the number of hops, and the obtained time domain occupied by the transport block.

In some embodiments, determining the time-domain length of the hop includes: determining the time-domain length of the hop according to a protocol agreement.

In some embodiments, determining the time-domain length of the hop according to the protocol agreement includes: obtaining a second preset value agreed by the protocol; in which the second preset value is an integer greater than zero; determining the second preset value as the time-domain length of the hop.

For example, when the protocol agrees that the second preset value is 5, the time-domain length of the hop is 5. Of course, the protocol may also agree that the second preset value is another integer, which is not limited in the disclosure.

In some embodiments, determining the time-domain length of the hop according to the protocol agreement includes: obtaining a time-domain length occupied by the transport block; and determining the time-domain length of the hop according to a correspondence relationship agreed by the protocol between the time-domain length occupied by the transport block and the time-domain length of the hop, and the obtained time-domain length occupied by the transport block.

It should be understood that the correspondence relationship agreed by the protocol between the time-domain length occupied by the transport block and the time-domain length of the hop may be the one-to-one correspondence relationship, that is, the time-domain length of the hop corresponds to different values according to different time-domain lengths occupied by transport blocks. Alternatively, the correspondence relationship between the time-domain length occupied by the transport block and the time-domain length of the hop is the proportional relationship. Alternatively, the correspondence relationship is the other relationship in which the value of one side is obtained according to the value of the other side, that is, the time-domain length of the hop may be directly determined according to the time-domain length occupied by the transport block.

For example, the protocol agrees that when the time-domain length occupied by the transport block is 16 symbols, the corresponding time-domain length of the hop is 6. When the obtained time-domain length occupied by the transport block is 16 symbols, it is determined that the time-domain length of the hop is 6.

In some embodiments, determining the time-domain length of the hop according to the protocol agreement includes: obtaining a number of DMRSs configured in the PUSCH; and determining the time-domain length of the hop according to a correspondence relationship agreed by the protocol between the number of DMRSs configured and the time-domain length of the hop, and the obtained number of DMRSs configured in the PUSCH.

It should be understood that the correspondence relationship agreed by the protocol between the number of DMRSs configured and the time-domain length of the hop may be the one-to-one correspondence relationship, that is, the time-domain length of the hop corresponds to different values according to different numbers of DMRSs. Alternatively, the correspondence relationship between the number of DMRSs configured and the time-domain length of the hop may be the proportional relationship. Alternatively, the correspondence relationship may be the other relationship in which the value of one side is obtained according to the value of the other side, that is, the time-domain length of the hop may be directly determined according to the number of DMRSs.

For example, the correspondence relationship between the number of DMRSs and the number of hops is the proportional relationship, such as the number of DMRSs is k times the number of hops and k is greater than or equal to 1. When k is equal to 3 and the obtained number of DMRSs is 3, the time-domain length of the hop is determined to be 9.

In some embodiments, determining the time-domain length of the hop according to the protocol agreement includes: obtaining a time-domain length occupied by the transport block; and determining the time-domain length of the hop according to a number of hops agreed by the protocol, a correspondence relationship agreed by the protocol among the number of hops, the time-domain length occupied by the transport block and the time-domain length of the hop, and the obtained time-domain length occupied by the transport block.

In the embodiments of the disclosure, the number of hops is agreed by the protocol, and the correspondence relationship among the number of hops, the time-domain length occupied by the transport block and the time-domain length of the hop is agreed by the protocol, and then the time-domain length of the hop may be determined according to the obtained time-domain length occupied by the transport block.

In some embodiments, the correspondence relationship among the number of hops, the time-domain length occupied by the transport block and the time-domain length of the hop includes: the time-domain length occupied by the transport block being a product of the number of hops and the time-domain length of the hop.

For example, the protocol agrees that the number of hops is 6, and the time-domain length occupied by the transport block is the product of the number of hops and the time-domain length of the hop. After obtaining the time-domain length occupied by the transport block is 42, it may be determined that the time-domain length of the hop is 7.

In some embodiments, determining the time-domain length of the hop according to the protocol agreement includes: obtaining a position of an unavailable symbol in the PUSCH, in which the unavailable symbol cannot be used to transmit data; and determining a frequency hopping start position and a frequency hopping end position according to a correspondence relationship agreed by the protocol among the position of the unavailable symbol, the frequency hopping start position and the frequency hopping end position, and the obtained position of the unavailable symbol in the PUSCH.

For example, the unavailable symbol in the PUSCH is: in the unpaired spectrum, the guard symbol used for the downlink-to-uplink handover, configured by the high-layer signaling, is the unavailable symbol; or a 1-bit symbol pattern indication information configured in the DCI provided by the base station is the unavailable symbol; or the like. It should be understood that the unavailable symbol in the PUSCH is not only the two types of the above examples, and the above two types of unavailable symbols are only for illustration.

In some embodiments, the correspondence relationship agreed by the protocol among the position of the unavailable symbol, the frequency hopping start position and the frequency hopping end position includes: a position of an adjacent symbol previous to the unavailable symbol is the frequency hopping end position; and a position of an adjacent symbol following the unavailable symbol is the frequency hopping start position.

In detail, in the embodiments of the disclosure, the position of the unavailable symbol in the PUSCH is obtained, and the frequency hopping start position and the frequency hopping end position are determined according to the position of the unavailable symbol.

For example, as illustrated in FIG. 4, the position of the adjacent symbol previous to the position of the unavailable symbol is the frequency hopping end position; and the position of the adjacent symbol following the position of the unavailable symbol is the frequency hopping start position.

In some embodiments, determining the time-domain length of the hop according to the protocol agreement includes: obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

It should be understood that one radio frame is equal to 10 subframes, one subframe may include multiple slots, each slot includes a certain number of time-domain symbols, and the slot boundary may be the boundary of the time-domain symbol included in the slot. Each slot includes two slot boundaries, and two adjacent slots have a common slot boundary.

In some embodiments, the correspondence relationship agreed by the protocol among the position of the slot boundary, the frequency hopping start position and the frequency hopping end position includes: a position of an adjacent symbol previous to the position of the slot boundary is the frequency hopping end position; and a position of an adjacent symbol following the position of the slot boundary is the frequency hopping start position.

For example, as illustrated in FIG. 5, the position of the adjacent symbol previous to the position of the slot boundary is the frequency hopping end position; and the position of the adjacent symbol following the position of the slot boundary is the frequency hopping start position.

In some embodiments, determining the time-domain length of the hop according to the protocol agreement includes: obtaining a position of a slot boundary in the PUSCH and a second preset number of symbols; and determining a frequency hopping start position and a frequency hopping end position according to a correspondence relationship agreed by the protocol among the position of the slot boundary, the second preset number of symbols, the frequency hopping start position and the frequency hopping end position, and the obtained position of the slot boundary in the PUSCH and the obtained second preset number of symbols.

In some embodiments of the disclosure, the second preset number of symbols may be any value greater than 0 and less than the number of time-domain symbols included in the slot, which is not specifically limited.

In some embodiments, the correspondence relationship agreed by the protocol among the position of the slot boundary, the first preset number of symbols, the frequency hopping start position and the frequency hopping end position includes: a position of an adjacent symbol previous to the position of the slot boundary is the frequency hopping end position, and a position of an adjacent symbol following the position of the slot boundary is the frequency hopping start position; and a position of a symbol previous to the position of the slot boundary and separated by the first preset number of symbols from the position of the slot boundary is the frequency hopping start position, and a position of a symbol following the position of the slot boundary and separated by the first preset number of symbols from the position of the slot boundary is the frequency hopping end position.

For example, as illustrated in FIG. 6, when the number of time-domain symbols included in the slot is 14 and the first preset number of symbols is 7, the position of the adjacent symbol previous to the position of the slot boundary is the frequency hopping end position, and the position of the adjacent symbol following the position of the slot boundary is the frequency hopping start position; and the position of the symbol previous to the position of the slot boundary and separated by the first preset number of symbols from the position of the slot boundary is the frequency hopping start position, and the position of the symbol following the position of the slot boundary and separated by the first preset number of symbols from the position of the slot boundary is the frequency hopping end position.

In some embodiments, determining the time-domain length of the hop according to the protocol agreement includes: obtaining a time-domain length occupied by the transport block; and determining the time-domain length of the hop according to a number of hops preset by the protocol, a specific calculation rule preset by the protocol among the number of hops, the time-domain length occupied by the transport block and the time-domain length of the hop, and the obtained time-domain length occupied by the transport block.

In some embodiments, the specific calculation rule preset by the protocol among the number of hops, the time-domain length occupied by the transport block and the time-domain length of the hop includes: determining a time-domain length of the hop in a $i^{th}$ (i=1, 2, . . . , N−1) hop as floor(L/N); where L is the time-domain length occupied by the transport block. N is an integer; and determining a time-domain length of the hop in a $N^{th}$ hop as L−floor(L/N)*(N−1).

In some embodiments, the specific calculation rule preset by the protocol among the number of hops, the time-domain length occupied by the transport block and the time-domain length of the hop includes: determining a time-domain length of the hop in a $i^{th}$ (i=1, 2, . . . , N−L+floor(L/N)*N) hop as floor(L/N); where L is the time-domain length occupied by the transport block, N is an integer; and determining a time-domain length of the hop in a $i^{th}$ (i=1+N−L+floor(L/N)*N, . . . , N) hop as ceil(L/N).

In some embodiments, determining the time-domain length of the hop includes: determining the time-domain length of the hop according to a configuration of a base station.

In embodiments of the disclosure, the time-domain length of the hop may be determined through the configuration of the base station.

In some embodiments, determining the time-domain length of the hop according to the configuration of the base station includes: obtaining a fourth preset value configured by the base station; in which the fourth preset value is greater than or equal to 2; and determining the fourth preset value as the time-domain length of the hop.

For example, when the protocol agrees that the fourth preset value is 2, the time-domain length of the hop is 2. Of course, the protocol may also agree that the fourth preset value is another integer greater than 2, which is not limited in the disclosure.

In some embodiments, obtaining the fourth preset value configured by the base station includes: receiving the fourth preset value sent by the base station through an RMSI signaling, or an RRC signaling, or a DCI signaling, or an MAC CE signaling.

In the embodiments of the disclosure, the fourth preset value sent by the base station through the RMSI signaling, or the RRC signaling, or the DCI signaling, or the MAC CE signaling may be first received.

In some embodiments, indicating the fourth preset value by the base station through the DCI signaling includes: receiving the fourth preset value sent by the base station through the DCI signaling by multiplexing part or all of bits in an MCS field or in a TPC field in the DCI signaling or by adding a new field in the DCI signaling.

In some embodiments, determining the time-domain length of the hop according to the configuration of the base station includes: receiving one second parameter value in a second parameter set indicated by the base station, and determining the second parameter value as the number of hops.

In some embodiments, receiving the one second parameter value in the second parameter set, indicated by the base station includes: receiving the second parameter set configured by the base station through an RMSI signaling or through an RRC signaling; and receiving the one second parameter value in the second parameter set, sent by the base station through a DCI signaling or an MAC CE signaling.

IN some embodiments, receiving the one second parameter value in the second parameter set, indicated by the base station includes: receiving the second parameter set carried on a field added by the base station in an MCS table or in a TDRA table; and receiving the one second parameter value in the second parameter set, sent by the base station through a DCI signaling multiplexing an MCS field in the DCI signaling.

In some embodiments, determining the time-domain length of the hop according to the configuration of the base station includes: obtaining a time-domain length occupied by the transport block; and determining the time-domain length of the hop according to a number of hops configured by the base station, a specific calculation rule configured by the base station among the number of hops, the time-domain length occupied by the transport block and the time-domain length of the hop, and the obtained time-domain length occupied by the transport block.

In some embodiments, the specific calculation rule configured by the base station among the number of hops, the time-domain length occupied by the transport block and the time-domain length of the hop includes: determining a time-domain length of the hop in a $i^{th}$ ($i=1, 2 \ldots, N-1$) hop as floor(L/N); where L is the time-domain length occupied by the transport block, N is an integer; and determining a time-domain length of the hop in a $N^{th}$ hop as L−floor(L/N)*(N−1).

In some embodiments, the specific calculation rule configured by the base station among the number of hops, the time-domain length occupied by the transport block and the time-domain length of the hop includes: determining a time-domain length of the hop in a $i^{th}$ ($i=1, 2, \ldots, N-L+\text{floor}(L/N)*N$) hop as: floor(L/N) where L is the time-domain length occupied by the transport block, N is an integer; and determining a time-domain length of the hop in a $i^{th}$ ($i=1+N-L+\text{floor}(L/N)*N, \ldots, N$) hop as ceil(L/N).

In some embodiments, the frequency hopping pattern includes intra-slot frequency hopping, or inter-slot frequency hopping, or intra-transport-block frequency hopping, or intra-retransmission hopping frequency, or inter-retransmission frequency hopping.

The PUSCH frequency hopping pattern may be the intra-slot frequency hopping, or the inter-slot frequency hopping, or the intra-transport-block frequency hopping (intra-TB FH), or inter-repetition FH for TBoMS with repetition, or intra-repetition FH for TBoMS with repetition.

Figure 7:
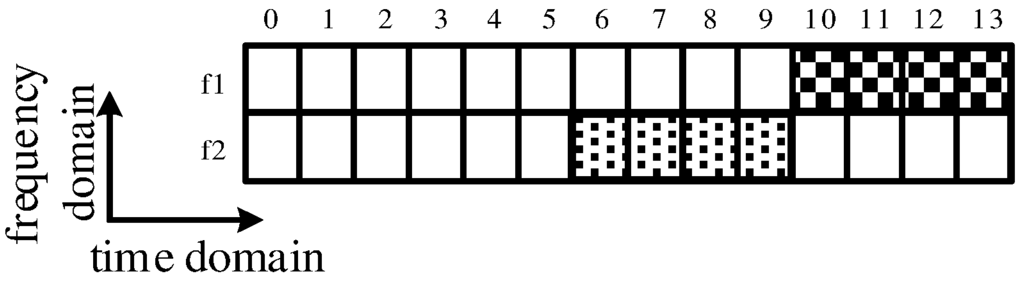
FIG. 7 is a schematic diagram of an intra-slot frequency hopping according to some embodiments of the disclosure.

The intra-slot frequency hopping (intra-slot FH) refers to that a frequency-domain resource used for information transmission may be changed according to predetermined rules within the slot, and one slot of the intra-slot frequency hopping is allowed to have two or more different frequency-hopping-center frequency points. For example, in the embodiments of the disclosure, each slot includes 14 time-domain symbols, and the slot includes two frequency hopping as an example. As illustrated in FIG. 7, it includes one slot in the time domain, and two frequency-domain resources f1 and f2 in the frequency domain. The information sent by the transmitter includes two parts, which are the first part of information and the second part of information, respectively. The transmitter uses the second frequency-domain resource f2 on symbols 6 to 9 to transmit the first part of information, and uses the frequency-domain resource f1 on symbols 10 to 13 to transmit the second part of information.

Figure 8:
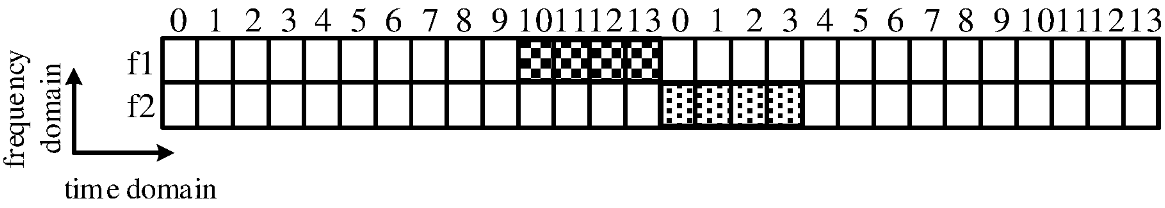
FIG. 8 is a schematic diagram of an inter-slot frequency hopping according to some embodiments of the disclosure.

The inter-slot frequency hopping (inter-slot FH) refers to that a frequency-domain resource used for information transmission remains unchanged within the slot, but the frequency-domain resource used for information transmission may be changed in different slots according to predetermined rules. For example, the embodiments of the disclosure take 14 time-domain symbols included in each slot as an example. As illustrated in FIG. 8, the time domain includes 2 slots, and each slot has 14 symbols. In the frequency domain, two frequency-domain resources f1 and f2 are included. The transmitter uses the frequency-domain resource f1 to transmit data on the first slot, and uses the frequency-domain resource f2 to transmit data on the second slot.

It should be understood that the intra-transport-block frequency hopping, the intra-retransmission hopping frequency, and the inter-retransmission frequency hopping are similar to the inter-slot frequency hopping and the intra-slot frequency hopping, which are not described herein again.

In some embodiments, performing the frequency hopping according to the frequency hopping pattern of the PUSCH, and the number of hops and/or the time-domain length of the hop includes: performing the frequency hopping according to the intra-slot frequency hopping, the number of hops determined within the slot according to the method in some embodiments, or the time-domain length of the hop determined within the slot according to the method in some embodiments.

It should be understood that, in the embodiments of the disclosure, after it is obtained that the frequency hopping pattern is the intra-slot frequency hopping, the number of hops within the slot may be determined within the slot according to the method for determining the number of hops in the above embodiments. The number of time-domain symbols within the slot is divided by the number of hops to obtain the time-domain length of the hop, so that the terminal device may perform the frequency hopping according to the number of hops and time-domain length of the hop within the slot. Alternatively, after it is obtained that the frequency hopping pattern is the intra-slot frequency hopping, the time-domain length of the hop within the slot may be determined within the slot according to the method for determining the time-domain length of the hop in the above embodiments, and the number of time-domain symbols included within the slot is divided by the time-domain length of the hop to obtain the number of hops, so that the terminal device may perform the frequency hopping according to the intra-slot frequency hopping, the number of hops, or the time-domain length of the hop.

For the solution of determining the number of hops or determining the time-domain length of the hop in the embodiments of the disclosure, reference may be made to the discussion in the above embodiments, and details are not repeated herein.

In some embodiments, performing the frequency hopping according to the frequency hopping pattern of the PUSCH, and the number of hops and/or the time-domain length of the hop includes: performing the frequency hopping according to the inter-slot frequency hopping, the number of hops determined within the slot according to the method in the above embodiments, and the time-domain length of the hop determined within the slot according to the method in the above embodiments.

It should be understood that, in the embodiments of the disclosure, after it is obtained that the frequency hopping pattern is the inter-slot frequency hopping, the number of hops between slots may be determined between slots according to the method for determining the number of hops in the above embodiments, and after it is obtained that the frequency hopping pattern is the inter-slot frequency hopping, the time-domain length of the hop may be determined between slots according to the method for determining the time-domain length of the hop in the above embodiments. After obtaining the number of hops of frequency hopping and time-domain length of the hop between slots, the terminal device may perform the frequency hopping according to the inter-slot frequency hopping, the number of hops of frequency hopping, and the time-domain length of the hop.

For the solutions of determining the number of hops and determining the time-domain length of the hop in the embodiments of the disclosure, reference may be made to the discussion in the above embodiments, and details are not repeated herein.

In some embodiments, performing the frequency hopping according to the frequency hopping pattern of the PUSCH, and the number of hops and/or the time-domain length of the hop includes: performing the frequency hopping according to the intra-transport-block frequency hopping, the number of hops determined within the transport block according to the method in the above embodiments, or the time-domain length of the hop determined within the transport block according to the method in the above embodiments.

It should be understood that, in embodiments of the disclosure, after it is obtained that the frequency hopping pattern is the intra-transport-block frequency hopping, the number of hops within the transport block is determined within the transport block according to the method for determining the number of hops in the above embodiments. The time-domain length of the hop is obtained by dividing the number of time-domain symbols included within the transport block by the number of hops, so that the terminal device may perform the frequency hopping according to the intra-transport-block frequency hopping, the number of hops, or the time-domain length of the hop. Alternatively, after it is obtained that the frequency hopping pattern is the intra-transport-block frequency hopping, the time-domain length of the hop within the transport block may be determined within the transport block according to the method for determining the time-domain length of the hop in the above embodiments, and the number of time-domain symbols included within the transport block is divided by the time-domain length of the hop to obtain the number of hops, so that the terminal device may perform the frequency hopping according to the intra-transport-block frequency hopping, the number of hops, or the time-domain length of the hop.

For the solutions of determining the number of hops and determining the time-domain length of the hop in the embodiments of the disclosure, reference may be made to the discussion in the above embodiments, and details are not repeated herein.

In some embodiments, performing the frequency hopping according to the frequency hopping pattern of the PUSCH, and the number of hops and/or the time-domain length of the hop includes: performing the frequency hopping according to the intra-retransmission hopping frequency, the number of hops determined within the retransmission by the method in the above embodiments, or the time-domain length of the hop determined within the retransmission by the method in the above embodiments.

It should be understood that, in the embodiments of the disclosure, after it is obtained that the frequency hopping pattern is the intra-retransmission hopping frequency, the number of hops within the retransmission may be determined within the retransmission according to the method for determining the number of hops in the above embodiments. The number of time-domain symbols included within the retransmission is divided by the number of hops to obtain the time-domain length of the hop, so that the terminal device may perform the frequency hopping according to the intra-retransmission hopping frequency and according to the number of hops or the time-domain length of the hop. Alternatively, after it is obtained that the frequency hopping pattern is the intra-retransmission hopping frequency, the time-domain length of the hop within the retransmission may be determined within the retransmission according to the method for determining the time-domain length of the hop in the above embodiments. The number of time-domain symbols included within the retransmission is divided by the time-domain length of the hop to obtain the number of hops, so that the terminal device may perform the frequency hopping according to the intra-retransmission hopping frequency, the number of hops, or the time-domain length of the hop.

For the solutions of determining the number of hops and determining the time-domain length of the hop in the embodiments of the disclosure, reference may be made to the discussion in the above embodiments, and details are not repeated herein.

In some embodiments, performing the frequency hopping according to the frequency hopping pattern of the PUSCH, and the number of hops and/or the time-domain length of the hop includes: performing the frequency hopping according to the inter-retransmission frequency hopping, the number of hops determined by the method in the above embodiments, or the time-domain length of the hop determined by the method in the above embodiments.

It should be understood that, in embodiments of the disclosure, after it is obtained that the frequency hopping pattern is the inter-retransmission frequency hopping, the number of hops between retransmissions may be determined between retransmissions according to the method for determining the number of hops in the above embodiments. After it is obtained that the frequency hopping pattern is the inter-retransmission frequency hopping, the time-domain length of the hop between retransmissions may be determined between retransmissions according to the method for determining the time-domain length of the hop. After obtaining the number of hops and time-domain length of the hop between retransmissions, the terminal device may perform the frequency hopping according to the inter-retransmission frequency hopping, the number of frequency hopping hops and the time per hop. field length for frequency hopping.

For the solutions of determining the number of hops and determining the time-domain length of the hop in the embodiments of the disclosure, reference may be made to the discussion in the above embodiments, and details are not repeated herein.

In some embodiments, each hop in the frequency hopping includes a DMRS symbol.

Each hop in the frequency hopping includes a DMRS symbol, which may be used by the terminal device to determine the channel quality.

In some embodiments, in response to enabling the frequency hopping pattern of the PUSCH includes: enabling the frequency hopping pattern of the PUSCH in response to a frequency hopping indication, from the base station, carried on an RRC signaling, or a RMSI signaling, or an MAC CE signaling, or a DCI signaling.

Figure 9:
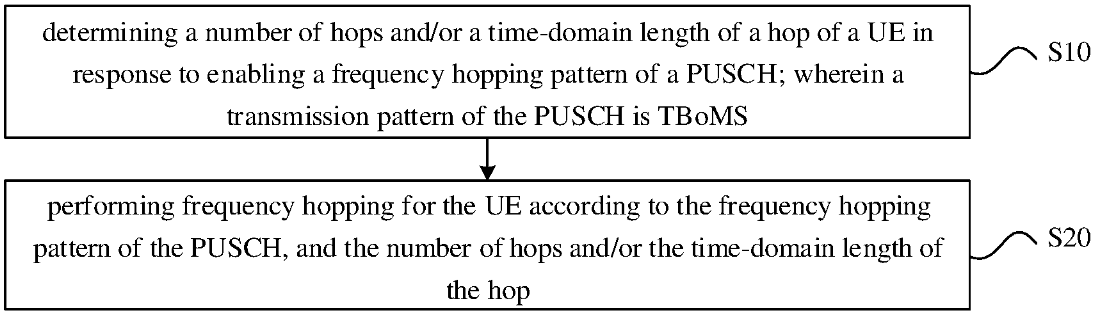
FIG. 9 is a schematic flowchart of another frequency hopping method according to some embodiments of the disclosure.

FIG. 9 is a schematic flowchart of another frequency hopping method according to some embodiments of the disclosure. The method is performed by a base station. As illustrated in FIG. 9, the method may include but not limited to the following step.

S10, a number of hops and/or a time-domain length of a hop of a user equipment (UE) is determined in response to enabling a frequency hopping pattern of a PUSCH; in which a transmission pattern of the PUSCH is TBoMS.

S20, frequency hopping is performed for the UE according to the frequency hopping pattern of the PUSCH, and the number of hops and/or the time-domain length of the hop.

In some embodiments, determining the number of hops includes: determining the number of hops according to a protocol agreement.

In some embodiments, determining the number of hops according to the protocol agreement includes: obtaining a fifth preset value agreed by the protocol; in which the fifth preset value is greater than or equal to 2; and determining the fifth preset value as the number of hops.

In some embodiments, determining the number of hops according to the protocol agreement includes: obtaining a time-domain length occupied by the transport block; and determining the number of hops according to a correspondence relationship agreed by the protocol between the time-domain length occupied by the transport block and the number of hops, and the obtained time-domain length occupied by the transport block.

In some embodiments, determining the number of hops according to the protocol agreement includes: obtaining a number of DMRSs configured in the PUSCH; and determining the number of hops according to a correspondence relationship agreed by the protocol between the number of DMRSs configured and the number of hops, and the obtained number of DMRSs configured in the PUSCH.

In some embodiments, determining the number of hops according to the protocol agreement includes: obtaining a time-domain length occupied by the transport block; and determining the number of hops according to a time-domain length of the hop agreed by the protocol, a correspondence relationship agreed by the protocol among the time-domain length of the hop, the time-domain length occupied by the transport block and the number of hops, and the obtained time-domain length occupied by the transport block.

In some embodiments, the correspondence relationship agreed by the protocol among the time-domain length of the hop, the time-domain length occupied by the transport block and the number of hops includes: the time-domain length occupied by the transport block being a product of the number of hops and the time-domain length of the hop.

In some embodiments, determining the number of hops according to the protocol agreement includes: obtaining a position of an unavailable symbol in the PUSCH, in which the unavailable symbol cannot be used to transmit data; and determining a frequency hopping start position and a frequency hopping end position according to a correspondence relationship agreed by the protocol among the position of the unavailable symbol, the frequency hopping start position and the frequency hopping end position, and the obtained position of the unavailable symbol in the PUSCH.

In some embodiments, the correspondence relationship agreed by the protocol among the position of the unavailable symbol, the frequency hopping start position and the frequency hopping end position includes: a position of an adjacent symbol previous to the unavailable symbol is the frequency hopping end position; and a position of an adjacent symbol following the unavailable symbol is the frequency hopping start position.

In some embodiments, determining the number of hops according to the protocol agreement includes: obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

In some embodiments, the correspondence relationship agreed by the protocol among the position of the slot boundary, the frequency hopping start position and the frequency hopping end position includes: a position of an adjacent symbol previous to the position of the slot boundary is the frequency hopping end position; and a position of an adjacent symbol following the position of the slot boundary is the frequency hopping start position.

In some embodiments, determining the number of hops according to the protocol agreement includes: obtaining a position of a slot boundary in the PUSCH and a third preset number of symbols; and determining a frequency hopping start position and a frequency hopping end position according to a correspondence relationship agreed by the protocol among the position of the slot boundary, the third preset number of symbols, the frequency hopping start position and the frequency hopping end position, and the obtained position of the slot boundary in the PUSCH and the obtained third preset number of symbols.

In some embodiments, the correspondence relationship agreed by the protocol among the position of the slot boundary, the third preset number of symbols, the frequency hopping start position and the frequency hopping end position includes: a position of an adjacent symbol previous to the position of the slot boundary is the frequency hopping end position, and a position of an adjacent symbol following the position of the slot boundary is the frequency hopping start position; and a position of a symbol previous to the position of the slot boundary and separated by the third preset number of symbols from the position of the slot boundary is the frequency hopping start position, and a position of a symbol following the position of the slot boundary and separated by the third preset number of symbols from the position of the slot boundary is the frequency hopping end position.

In some embodiments, determining the number of hops includes: determining the number of hops according to a configuration of a base station.

In some embodiments, determining the number of hops according to the configuration of the base station includes: configuring a sixth preset value to the UE; in which the sixth preset value is greater than or equal to 2; and determining the sixth preset value as the number of hops.

In some embodiments, configuring the sixth preset value to the UE includes: configuring an RMSI signaling, or an RRC signaling, or a DCI signaling, or an MAC CE signaling to the UE to indicate the sixth preset value.

In some embodiments, configuring the DCI signaling to the UE to indicate the sixth preset value includes: configuring the DCI signaling to the UE to indicate the sixth preset value by multiplexing part or all of bits in an MCS field or in a TPC field in the DCI signaling or by adding a new field in the DCI signaling.

In some embodiments, determining the number of hops according to the configuration of the base station includes: configuring one third parameter value in a third parameter set indicated to the UE, and determining the first parameter value as the number of hops.

In some embodiments, configuring the one third parameter value in the third parameter set indicated to the UE includes: sending an RMSI signaling or an RRC signaling configured with the third parameter set; and sending a DCI signaling or an MAC CE signaling to the UE to indicate the one third parameter value in the third parameter set.

In some embodiments, configuring the one third parameter value in the third parameter set indicated to the UE includes: sending an MCS table or a TDRA table added with three fields for carrying the third parameter set; and sending a DCI signaling by multiplexing an MCS field in the DCI signaling to indicate the one third parameter value in the third parameter set.

In some embodiments, determining the number of hops according to the configuration of the base station includes: obtaining a time-domain length occupied by the transport block; and determining the number of hops according to a time-domain length of the hop configured by the base station, a specific calculation rule configured by the base station among the time-domain length of the hop, the time-domain length occupied by the transport block and the number of hops, and the obtained time domain occupied by the transport block.

In some embodiments, determining the time-domain length of the hop includes: determining the time-domain length of the hop according to a protocol agreement.

In some embodiments, determining the time-domain length of the hop according to the protocol agreement includes: obtaining a seventh preset value agreed by the protocol; in which the seventh preset value is an integer greater than zero; and determining the seventh preset value as the time-domain length of the hop.

In some embodiments, determining the time-domain length of the hop according to the protocol agreement includes: obtaining a time-domain length occupied by the transport block; and determining the time-domain length of the hop according to a correspondence relationship agreed by the protocol between the time-domain length occupied by the transport block and the time-domain length of the hop, and the obtained time-domain length occupied by the transport block.

In some embodiments, determining the time-domain length of the hop according to the protocol agreement includes: obtaining a number of DMRSs configured in the PUSCH; and determining the time-domain length of the hop according to a correspondence relationship agreed by the protocol between the number of DMRSs configured and the time-domain length of the hop, and the obtained number of DMRSs configured in the PUSCH.

In some embodiments, determining the time-domain length of the hop according to the protocol agreement includes: obtaining a time-domain length occupied by the transport block; and determining the time-domain length of the hop according to a number of hops agreed by the protocol, a correspondence relationship agreed by the protocol among the number of hops, the time-domain length occupied by the transport block and the time-domain length of the hop, and the obtained time-domain length occupied by the transport block.

In some embodiments, the correspondence relationship among the number of hops, the time-domain length occupied by the transport block and the time-domain length of the hop includes: the time-domain length occupied by the transport block being a product of the number of hops and the time-domain length of the hop.

In some embodiments, determining the time-domain length of the hop according to the protocol agreement includes: obtaining a position of an unavailable symbol in the PUSCH, in which the unavailable symbol cannot be used to transmit data, and determining a frequency hopping start position and a frequency hopping end position according to a correspondence relationship agreed by the protocol among the position of the unavailable symbol, the frequency hopping start position and the frequency hopping end position, and the obtained position of the unavailable symbol in the PUSCH.

In some embodiments, the correspondence relationship agreed by the protocol among the position of the unavailable symbol, the frequency hopping start position and the frequency hopping end position includes: a position of an adjacent symbol previous to the unavailable symbol is the frequency hopping end position; and a position of an adjacent symbol following the unavailable symbol is the frequency hopping start position.

In some embodiments, determining the time-domain length of the hop according to the protocol agreement includes: obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

In some embodiments, the correspondence relationship agreed by the protocol among the position of the slot boundary, the frequency hopping start position and the frequency hopping end position includes: a position of an adjacent symbol previous to the position of the slot boundary is the frequency hopping end position; and a position of an adjacent symbol following the position of the slot boundary is the frequency hopping start position.

In some embodiments, determining the time-domain length of the hop according to the protocol agreement includes: obtaining a position of a slot boundary in the PUSCH and a fourth preset number of symbols; and determining a frequency hopping start position and a frequency hopping end position according to a correspondence relationship agreed by the protocol among a position of a slot boundary, a fourth preset number of symbols, the frequency hopping start position and the frequency hopping end position, and the obtained position of the slot boundary in the PUSCH and the obtained fourth preset number of symbols.

In some embodiments, the correspondence relationship agreed by the protocol among the position of the slot boundary, the fourth preset number of symbols, the frequency hopping start position and the frequency hopping end position includes: a position of an adjacent symbol previous to the position of the slot boundary is the frequency hopping end position, and a position of an adjacent symbol following the position of the slot boundary is the frequency hopping start position; and a position of a symbol previous to the position of the slot boundary and separated by the fourth preset number of symbols from the position of the slot boundary is the frequency hopping start position, and a position of a symbol following the position of the slot boundary and separated by the fourth preset number of symbols from the position of the slot boundary is the frequency hopping end position.

In some embodiments, determining the time-domain length of the hop according to the protocol agreement includes: obtaining a time-domain length occupied by the transport block; and determining the time-domain length of the hop according to a number of hops preset by the protocol, a specific calculation rule preset by the protocol among the number of hops, the time-domain length occupied by the transport block and the time-domain length of the hop, and the obtained time-domain length occupied by the transport block.

In some embodiments, the specific calculation rule preset by the protocol among the number of hops, the time-domain length occupied by the transport block and the time-domain length of the hop includes: determining a time-domain length of the hop in a $i^{th}$ (i=1, 2, . . . , N−1) hop as: floor(L/N); where L is the time-domain length occupied by the transport block, N is an integer; and determining a time-domain length of the hop in a $N^{th}$ hop as: L−floor(L/N)*(N−1).

In some embodiments, the specific calculation rule preset by the protocol among the number of hops, the time-domain length occupied by the transport block and the time-domain length of the hop includes: determining a time-domain length of the hop in a $i^{th}$ (i=1, 2, . . . , N−L+floor(L/N)*N) hop as: floor(L/N); where L is the time-domain length occupied by the transport block, N is an integer; and determining a time-domain length of the hop in a $i^{th}$ (i=1+N−L+floor(L/N)*N, . . . , N) hop as: ceil(L/N).

In some embodiments, determining the time-domain length of the hop includes: determining the time-domain length of the hop according to a configuration of a base station.

In some embodiments, determining the time-domain length of the hop according to the configuration of the base station includes: configuring a fourth preset value to the UE; in which the eighth preset value is greater than or equal to 2, and determining the eighth preset value as the time-domain length of the hop.

In some embodiments, configuring the eighth preset value to the UE includes: configuring an RMSI signaling, or an RRC signaling, or a DCI signaling, or an MAC CE signaling to the UE to indicate the eighth preset value.

In some embodiments, configuring the DCI signaling to the UE to indicate the eighth preset value includes: configuring the DCI signaling to the UE to indicate the eighth preset value by multiplexing part or all of bits in a MCS field or in a TPC field in the DCI signaling or by adding a new field in the DCI signaling.

In some embodiments, determining the time-domain length of the hop according to the configuration of the base station includes: configuring one fourth parameter value in a fourth parameter set indicated to the UE, and determining the fourth parameter value as the number of hops.

In some embodiments, configuring the one fourth parameter value in the fourth parameter set indicated to the UE includes: sending an RMSI signaling or an RRC signaling configured with the fourth parameter set; and sending a DCI signaling or an MAC CE signaling, to the UE to indicate the one fourth parameter value in the fourth parameter set.

In some embodiments, configuring the one fourth parameter value in the fourth parameter set indicated to the UE includes: sending a MCS table or a TDRA table added with three fields for carrying the fourth parameter set; and sending a DCI signaling multiplexing an MCS field in the DCI signaling to indicate the one fourth parameter value in the fourth parameter set.

In some embodiments, determining the time-domain length of the hop according to the configuration of the base station includes: obtaining a time-domain length occupied by the transport block; and determining the time-domain length of the hop according to a number of hops configured by the base station, a specific calculation rule configured by the base station among the number of hops, the time-domain length occupied by the transport block and the time-domain length of the hop, and the obtained time-domain length occupied by the transport block.

In some embodiments, the specific calculation rule configured by the base station among the number of hops, the time-domain length occupied by the transport block and the time-domain length of the hop includes: determining a time-domain length of the hop in a $i^{th}$ (i=1, 2, . . . , N−1) hop as: floor(L/N); where L is the time-domain length occupied by the transport block, N is an integer; and determining a time-domain length of the hop in a $N^{th}$ hop as: L−floor(L/N)*(N−1).

In some embodiments, the specific calculation rule configured by the base station among the number of hops, the time-domain length occupied by the transport block and the time-domain length of the hop includes: determining a time-domain length of the hop in a $i^{th}$ (i=1, 2, . . . , N−L+floor(L/N)*N) hop as: floor(L/N); where L is the time-domain length occupied by the transport block. N is an integer; and determining a time-domain length of the hop in a $i^{th}$ (i=1+N−L+floor(L/N)*N . . . , N) hop as: ceil(L/N).

In some embodiments, the frequency hopping pattern includes intra-slot frequency hopping, or inter-slot frequency hopping, or intra-transport-block frequency hopping, or intra-retransmission hopping frequency, or inter-retransmission frequency hopping.

In some embodiments, performing the frequency hopping for the UE according to the frequency hopping pattern of the PUSCH, and the number of hops and/or the time-domain length of the hop includes: performing the frequency hopping for the UE according to the intra-slot frequency hopping, the number of hops determined according to the method in the above embodiments within a slot, and the time-domain length of the hop determined according to the method in the above embodiments within a slot.

In some embodiments, performing the frequency hopping for the UE according to the frequency hopping pattern of the PUSCH, and the number of hops and/or the time-domain length of the hop includes: performing the frequency hopping for the UE according to the inter-slot frequency hopping, the number of hops determined according to the method in the above embodiments, and the time-domain length of the hop determined according to the method in the above embodiments.

In some embodiments, performing the frequency hopping for the UE according to the frequency hopping pattern of the PUSCH, and the number of hops and/or the time-domain length of the hop includes: performing the frequency hopping for the UE according to the intra-transport-block frequency hopping, the number of hops determined according to the method in the above embodiments within a transport block, or the time-domain length of the hop determined according to the method in the above embodiments within a transport block.

In some embodiments, performing the frequency hopping for the UE according to the frequency hopping pattern of the PUSCH, and the number of hops and/or the time-domain length of the hop includes: performing the frequency hopping for the UE according to the intra-retransmission hopping frequency, the number of hops determined according to the method in the above embodiments within a retransmission copy, or the time-domain length of the hop determined according to the method in the above embodiments within a retransmission copy.

In some embodiments, performing the frequency hopping for the UE according to the frequency hopping pattern of the PUSCH, and the number of hops and/or the time-domain length of the hop includes: performing the frequency hopping for the UE according to the inter-retransmission frequency hopping, the number of hops determined according to the method in the above embodiments, and the time-domain length of the hop determined according to the method in the above embodiments.

In some embodiments, each hop in the frequency hopping includes a DMRS symbol.

In some embodiments, in response to enabling the frequency hopping pattern of the PUSCH includes: enabling the frequency hopping pattern of the PUSCH in response to sending a frequency hopping indication carried on an RRC signaling, or an RMSI signaling, or an MAC CE signaling, or a DCI signaling, to the UE.

In some embodiments, it includes: a transceiver module, configured to determine a number of hops and/or a time-domain length of the hop in response to enabling a frequency hopping pattern of a PUSCH; in which a transmission pattern of the PUSCH is TBoMS; and a processing module, configured to perform frequency hopping according to the frequency hopping pattern of the PUSCH, and the number of hops and/or the time-domain length of the hop.

In the frequency hopping method provided in the above embodiments of the disclosure, the specific processes of the corresponding steps are similar to the frequency hopping methods provided in the above embodiments, and achieve the same beneficial effects, which will not be repeated herein.

Figure 10:
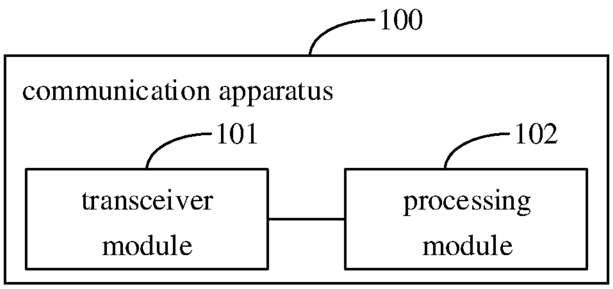
FIG. 10 is a block diagram of a communication apparatus according to some embodiments of the disclosure.

FIG. 10 is a block diagram of a communication apparatus according to some embodiments of the disclosure. As illustrated in FIG. 10, the communication apparatus 100 includes a transceiver module 101 and a processing module 102.

The transceiver module 101 is configured to determine a number of bops and/or a time-domain length of the hop in response to enabling a frequency hopping pattern of a PUSCH; in which a transmission pattern of the PUSCH is TBoMS.

The processing module 102 is configured to perform frequency hopping according to the frequency hopping pattern of the PUSCH, and the number of hops and/or the time-domain length of the hop.

Figure 11:
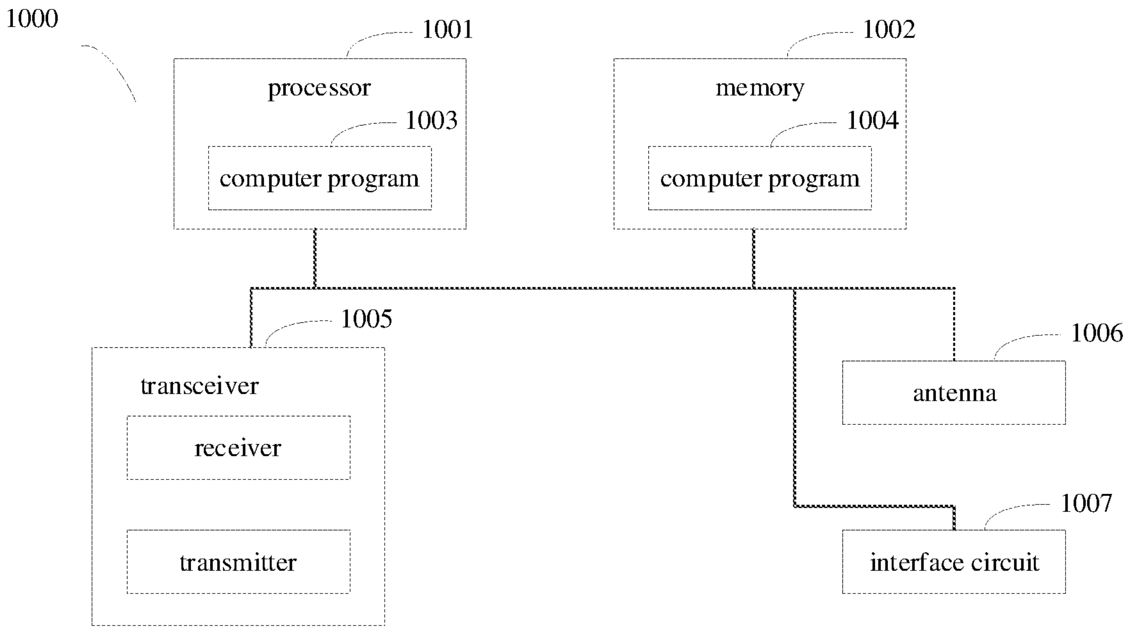
FIG. 11 is a block diagram of a communication device according to some embodiments of the disclosure.

FIG. 11 is a block diagram of a communication device 1000 according to some embodiments of the disclosure. The communication device 1000 may be a terminal device, or a chip, a chip system or a processor that supports the network device to implement the above methods, or a chip, a chip system or a processor that supports the terminal device to implement the above methods, or the like. The device may be used to implement the methods described in the foregoing method embodiments, and for details, reference may be made to the descriptions in the foregoing method embodiments.

The communication device 1000 may include one or more processors 1001. The processor 1001 may be a general-purpose processor, a special-purpose processor, or the like. For example, it may be a baseband processor or a central processing unit. The baseband processor may be used to process communication protocols and communication data. The central processing unit may be used to control the communication device (such as a base station, a baseband chip, a terminal device, a terminal device chip, a DU, a CU, or the like), execute a computer program, process data of the computer program, and the like.

Optionally, the communication device 1000 may further include one or more memories 1002 on which a computer program 1004 may be stored. The processor 1001 executes the computer program 1004, so that the communication device 1000 executes the methods described in the above method embodiments. Optionally, data may also be stored in the memory 1002. The communication device 1000 and the memory 1002 may be provided separately or integrated together.

Optionally, the communication device 1000 may further include a transceiver 1005 and an antenna 1006. The transceiver 1005 may be referred to as a transceiver unit, a transceiver, a transceiver circuit, or the like, which is used to implement a transceiver function. The transceiver 1005 may include a receiver and a transmitter. The receiver may be called a receiver or a receiving circuit or the like, for implementing a receiving function. The transmitter may be called a transmitter or a transmitting circuit or the like for implementing a transmitting function.

Optionally, the communication device 1000 may further include one or more interface circuits 1007. The interface circuit 1007 is used to receive code instructions and transmit them to the processor 1001. The processor 1001 executes the code instructions to cause the communication device 1000 to perform the methods described in the above method embodiments.

The communication device 1000 is the terminal device: the transceiver 1005 is used to execute S1 in FIG. 2 and the processor 1001 is used to execute S2 in FIG. 2.

The communication device 1000 is the network device: the transceiver 1005 is used to execute S10 in FIG. 9 and the processor 1001 is used to execute S20 in FIG. 9.

In an implementation, the processor 1001 may include a transceiver for implementing receiving and transmitting functions. For example, the transceiver may be a transceiver circuit, or an interface, or an interface circuit. The transceiver circuit, or the interface, or the interface circuit for implementing receiving and transmitting functions may be separate or integrated. The above-mentioned transceiver circuit, interface, or interface circuit may be used for reading and writing code/data, or the above-mentioned transceiver circuit, interface, or interface circuit may be used for signal transmission.

In an implementation manner, the processor 1001 may store a computer program 1003, and the computer program 1003 runs on the processor 1001 to enable the communication device 1000 to execute the methods described in the above method embodiments. The computer program 1003 may be embodied in the processor 1001, in which the processor 1001 may be implemented by hardware.

In an implementation manner, the communication device 1000 may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device but the scope of the communication device described in the disclosure is not limited thereto and the structure of the communication device may not be limited by FIG. 10. The communication device may be a stand-alone device or part of a larger device. For example, the communication means may be:

(1) a stand-alone IC, or a chip, or a chip system, or a chip subsystem;
(2) a set of one or more ICs, optionally, the set may also include a storage component for storing data and computer programs;
(3) an ASIC, such as a modem;
(4) a module that may be embedded in other devices;
(5) a receiver, a terminal device, an intelligent terminal device, a cellular phone, a wireless device, a handset, a mobile unit, an in-vehicle device, a network device, a cloud device, an artificial intelligence device, etc.;
(6) others.

Figure 12:
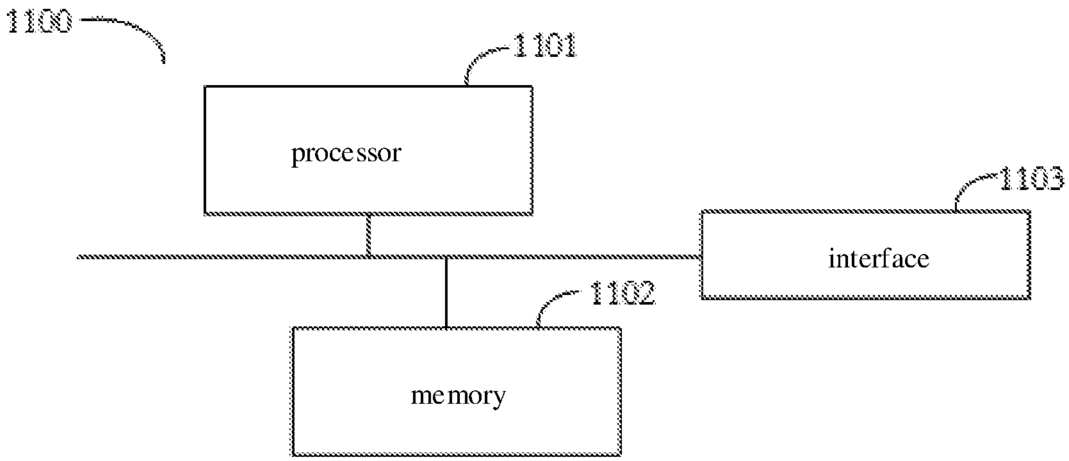
FIG. 12 is a block diagram of a chip according to some embodiments of the disclosure.

For the case that the communication device may be the chip or the chip system, reference may be made to the schematic structural diagram of the chip in FIG. 12. The chip in FIG. 11 includes a processor 1101 and an interface 1102. The number of processors 1101 may be one or more and the number of interfaces 1102 may be multiple.

For the case where the chip is used to implement functions of the terminal device in the embodiments of the disclosure:

The interface 1102 is used for executing S1 in FIG. 2; the processor 1101 is used for executing S2 in FIG. 2.

For the case where the chip is used to implement the function of the network device in the embodiments of the disclosure:

The interface 902 is used for executing S10 in FIG. 9; the processor 1101 is used for executing S20 in FIG. 9.

Optionally, the chip further includes a memory 1103. The memory 1103 is used to store necessary computer programs and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

Some embodiments of the disclosure further provide a communication system. The system includes the communication apparatus as a terminal device (such as the terminal device in the foregoing method embodiments) in the foregoing embodiments of FIG. 10 and a communication device as a network device. Or the system includes the communication device as a terminal device (such as the terminal device in the foregoing method embodiments) in the foregoing embodiments of FIG. 11 and a communication device as a network device.

The disclosure also provides a computer-readable storage medium on which instructions are stored, and when the instructions are executed by a computer, functions of any of the above method embodiments are realized.

The disclosure also provides a computer program product, which realizes functions of any of the above method embodiments when the computer program product is executed by a computer.

The beneficial effects of the above-mentioned computer-readable storage medium, computer program product and computer program are the same as those in the frequency hopping method described in some above-mentioned embodiments, and will not be repeated herein.

In the above-mentioned embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Unless the context otherwise requires, throughout the specification and claims, the term "comprise" and its other forms such as "comprise" and "comprising" are used to be interpreted as the meaning of openness and inclusion, that is, "including, but not limited to". In the description of the specification, the terms "one embodiment", "some embodiments", "exemplary embodiments", "example", "specific example" example)" or "some examples" and the like are intended to indicate that a particular feature, structure, material or characteristic related to the embodiments or examples is included in at least one embodiment or example of the disclosure. The schematic representations of the above terms are not necessarily referring to the same embodiment or example. Furthermore, the particular features, structures, materials or characteristics described may be included in any suitable manner in any one or more embodiments or examples.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by "first", "second", "third", "A", "B", "C" and "D", etc. There is no order or order of magnitude for the technical features described in "first", "second", "third", "A", "B", "C" and "D", etc.

The corresponding relationships shown in each table in this disclosure may be configured or predefined. Information values in each table are only examples and may be configured with other values, which are not limited in this disclosure. When configuring the corresponding relationships between the information and each parameter, it is not necessarily required to configure all the corresponding relationships indicated in each table. For example, in each table in this disclosure, the corresponding relationships shown in some rows may not be configured. For another example, appropriate deformation adjustments may be made based on each table, such as splitting, merging. The names of the parameters shown in the headings in each tables may also adopt other names that may be understood by the communication device, and the values or representations of the parameters may also be other values or representations that the communication device may understand. When each table is implemented, other data structures may also be used, for example, an array, a queue, a container, a stack, a linear table, a pointer, a link list, a tree, a graph, a structure, a class, a heap, a hash table, or the like.

Predefined in this disclosure may be understood as defined, predefined, stored, pre-stored, pre-negotiated, preconfigured, cured, or pre-fired.

Those skilled in the art may realize that units and algorithm steps of each example described in conjunction with the embodiments disclosed herein may be implemented in electronic hardware, or a combination of computer software and electronic hardware. Whether these functions are performed in hardware or software depends on the specific applications and design constraints of the technical solutions. Those skilled in the art may implement the described functions using different methods for each particular application, but such implementations should not be considered beyond the scope of this disclosure.

Those skilled in the art may clearly understand that, for the convenience and brevity of description, the specific working processes of the above-described systems, devices, and units may refer to the corresponding processes in the foregoing method embodiments, which will not be repeated herein.

The above are only specific implementations of the disclosure, but the scope of the disclosure is not limited to this. Those skilled in the art who is familiar with the technical scope disclosed in the disclosure may easily think of changes or replacements, which should cover within the scope of this disclosure. Therefore, the scope of the disclosure shall be subject to the scope of the claims.

What is claimed is:

1. A frequency hopping method, performed by a terminal device, comprising:

determining a frequency hopping pattern of a physical uplink shared channel (PUSCH);

determining at least one of a number of hops or a time-domain length of a hop, wherein a transmission pattern of the PUSCH is transport block processing over multi-slots (TBoMS); and performing frequency hopping according to the frequency hopping pattern of the PUSCH, and the at least one of the number of hops or the time-domain length of the hop, wherein determining the number of hops comprises: determining the number of hops according to a protocol agreement;

wherein determining the number of hops according to the protocol agreement comprises:

obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

2. The method according to claim 1, wherein determining the number of hops according to the protocol agreement comprises:

obtaining a time-domain length occupied by the transport block; and determining the number of hops according to a correspondence relationship agreed by the protocol between the time-domain length occupied by the transport block and the number of hops, and the obtained time-domain length occupied by the transport block.

3. The method according to claim 1, wherein determining the number of hops according to the protocol agreement comprises:

obtaining a time-domain length occupied by the transport block; and determining the number of hops according to a time-domain length of the hop agreed by the protocol, a correspondence relationship agreed by the protocol among the time-domain length of the hop, the time-domain length occupied by the transport block and the number of hops, and the obtained time-domain length occupied by the transport block.

4. The method according to claim 1, wherein the correspondence relationship agreed by the protocol among the position of the slot boundary, the frequency hopping start position and the frequency hopping end position comprises:

a position of an adjacent symbol previous to the position of the slot boundary is the frequency hopping end position; and a position of an adjacent symbol following the position of the slot boundary is the frequency hopping start position.

5. The method according to claim 1, wherein determining the time-domain length of the hop comprises: determining the time-domain length of the hop according to a protocol agreement.

6. The method according to claim 5, wherein determining the time-domain length of the hop according to the protocol agreement comprises:

obtaining a preset value agreed by the protocol, wherein the preset value is an integer greater than zero; and determining the preset value as the time-domain length of the hop.

7. A non-transitory computer-readable storage medium storing instructions that, when executed by a processor of a terminal, cause the terminal to perform the method of claim 1.

8. A frequency hopping method, performed by a base station, comprising:

determining a frequency hopping pattern of a physical uplink shared channel (PUSCH);

determining at least one of a number of hops or a time-domain length of a hop of a user equipment (UE), wherein a transmission pattern of the PUSCH is transport block processing over multi-slots (TBoMS); and performing frequency hopping for the UE according to the frequency hopping pattern of the PUSCH, and the at least one of the number of hops or the time-domain length of the hop, wherein determining the number of hops comprises: determining the number of hops according to a protocol agreement;

wherein determining the number of hops according to the protocol agreement comprises:

obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

9. The method according to claim 8, wherein determining the number of hops according to the protocol agreement comprises:

obtaining a time-domain length occupied by the transport block; and determining the number of hops according to a correspondence relationship agreed by the protocol between the time-domain length occupied by the transport block and the number of hops, and the obtained time-domain length occupied by the transport block.

10. The method according to claim 8, wherein determining the number of hops according to the protocol agreement comprises:

obtaining a time-domain length occupied by the transport block; and determining the number of hops according to a time-domain length of the hop agreed by the protocol, a correspondence relationship agreed by the protocol among the time-domain length of the hop, the time-domain length occupied by the transport block and the number of hops, and the obtained time-domain length occupied by the transport block.

11. The method according to claim 8, wherein the correspondence relationship agreed by the protocol among the position of the slot boundary, the frequency hopping start position and the frequency hopping end position comprises:

a position of an adjacent symbol previous to the position of the slot boundary is the frequency hopping end position; and a position of an adjacent symbol following the position of the slot boundary is the frequency hopping start position.

12. The method according to claim 8, wherein determining the time-domain length of the hop comprises: determining the time-domain length of the hop according to a protocol agreement.

13. The method according to claim 12, wherein determining the time-domain length of the hop according to the protocol agreement comprises:

obtaining a preset value agreed by the protocol, wherein the preset value is an integer greater than zero; and determining the preset value as the time-domain length of the hop.

14. A base station, comprising:

a processor; and a memory storing a computer program, wherein the processor is configured to perform the method of claim 8.

15. A non-transitory computer-readable storage medium storing instructions that, when executed by a processor of a base station, cause the base station to perform the method of claim 8.

16. A terminal, comprising:

a processor; and a memory storing a computer program, wherein the processor is configured to:

determine a frequency hopping pattern of a physical uplink shared channel (PUSCH);

determine at least one of a number of hops or a time-domain length of a hop, wherein a transmission pattern of the PUSCH is transport block processing over multi-slots (TBoMS); and perform frequency hopping according to the frequency hopping pattern of the PUSCH, and the at least one of the number of hops or the time-domain length of the hop, wherein the processor is further configured to:

determine the number of hops according to a protocol agreement;

wherein determining the number of hops according to the protocol agreement comprises:

obtaining a position of a slot boundary in the PUSCH; and determining a frequency hopping start position and a frequency hopping end position according to a correspondence relationship agreed by the protocol among the position of the slot boundary, the frequency hopping start position and the frequency hopping end position, and the obtained position of the slot boundary in the PUSCH.

* * * * *